Figure 1:
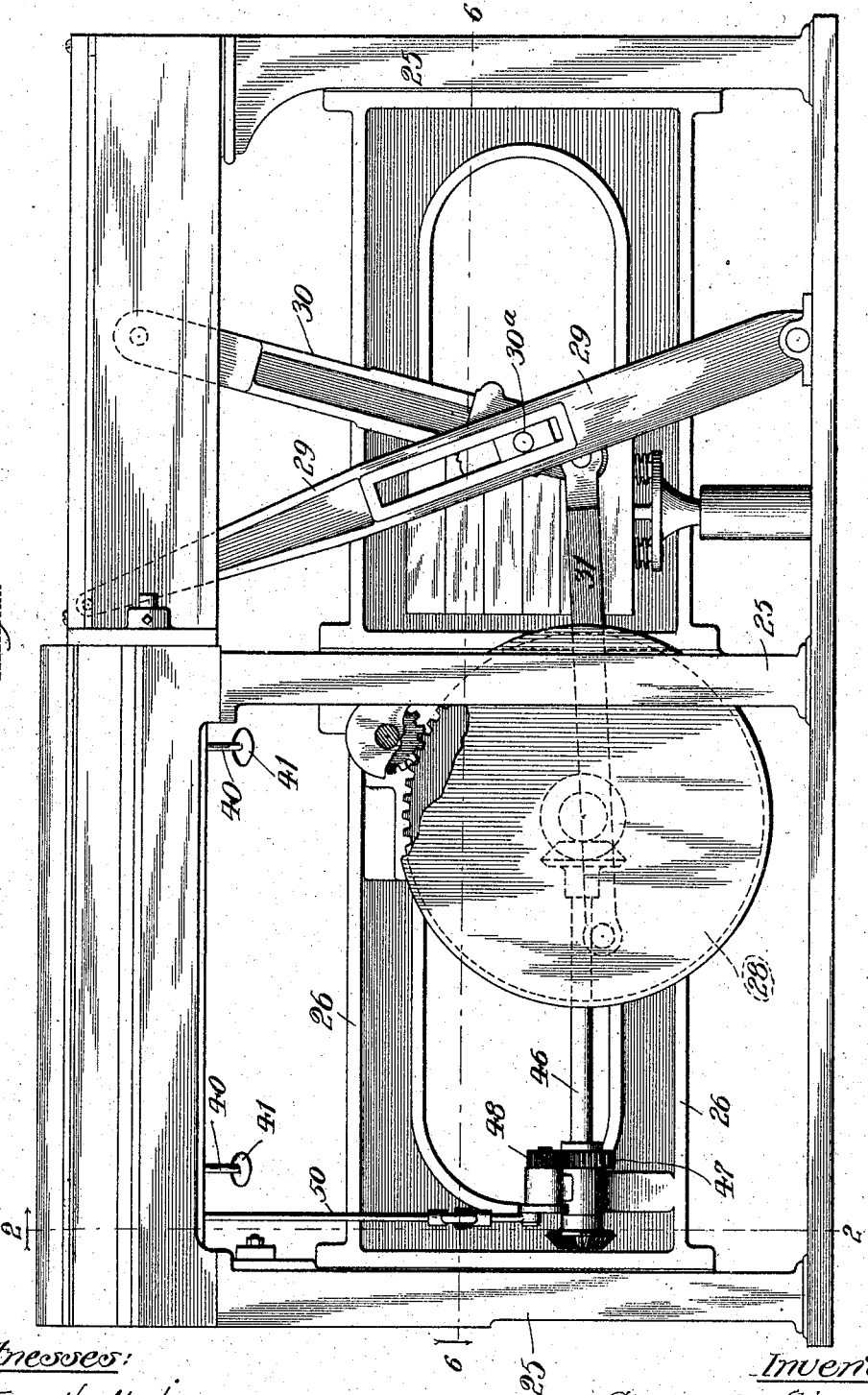

No. 781,253. PATENTED JAN. 31, 1905.
G. D. WHITCOMB.
KNITTING MACHINE.
APPLICATION FILED NOV. 14, 1900.

7 SHEETS—SHEET 1.

Witnesses:
Watson Hurlburt
Wm. Geiger

Inventor:
George D. Whitcomb
By Louis K. Gillson Atty.

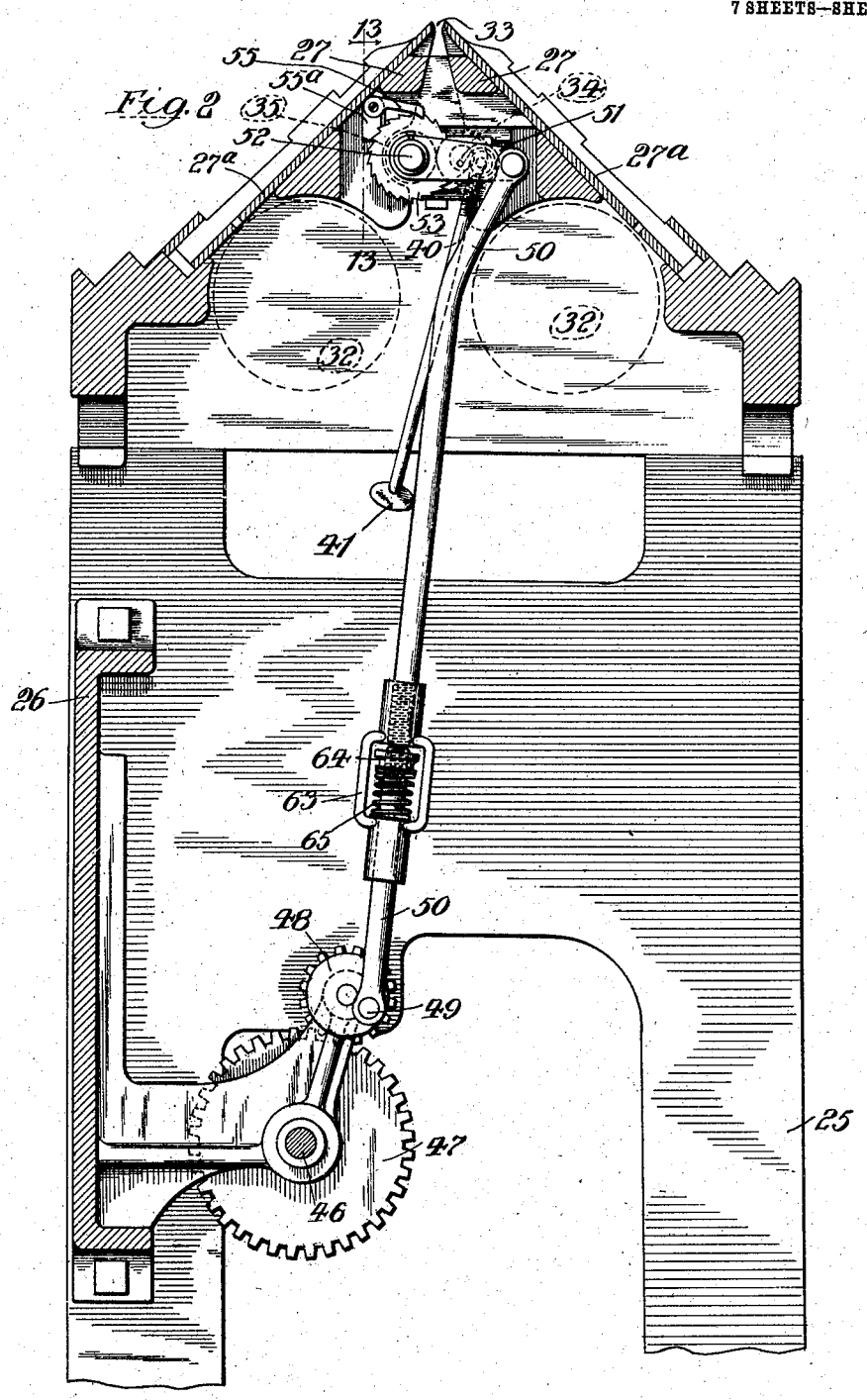

No. 781,253. PATENTED JAN. 31, 1905.
G. D. WHITCOMB.
KNITTING MACHINE.
APPLICATION FILED NOV. 14, 1900.
7 SHEETS—SHEET 3.
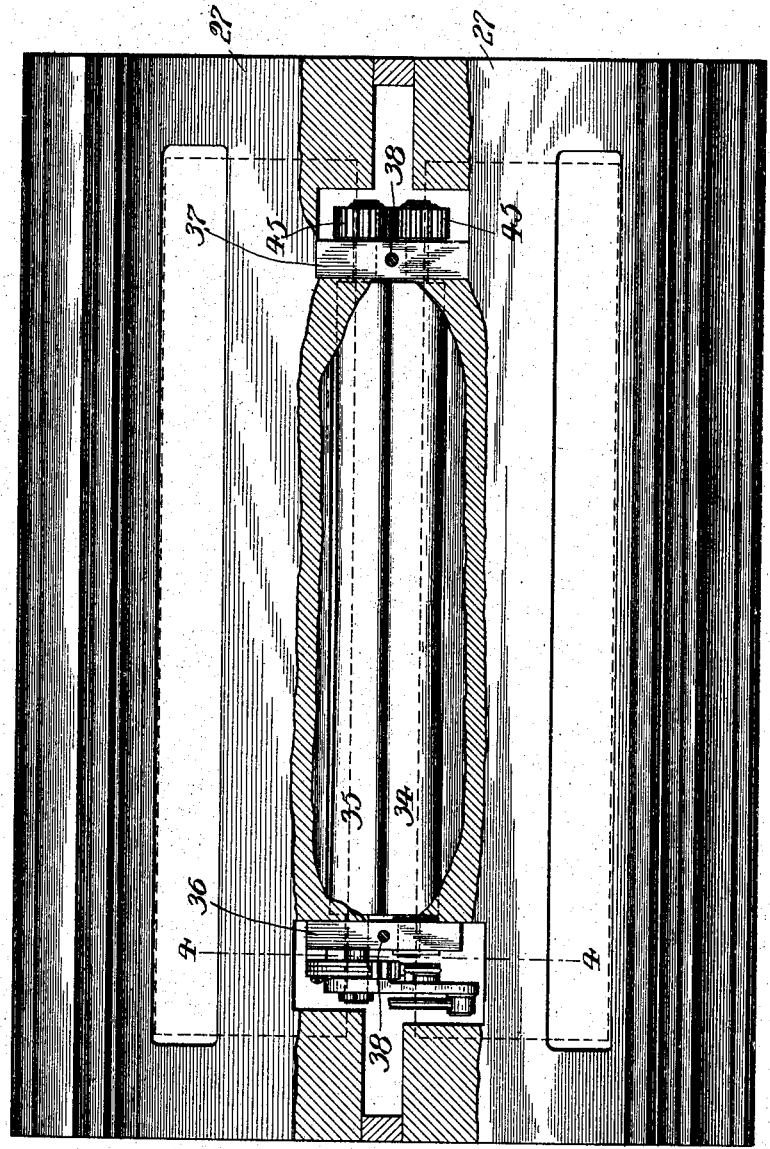

No. 781,253. PATENTED JAN. 31, 1905.
G. D. WHITCOMB.
KNITTING MACHINE.
APPLICATION FILED NOV. 14, 1900.
7 SHEETS—SHEET 4.
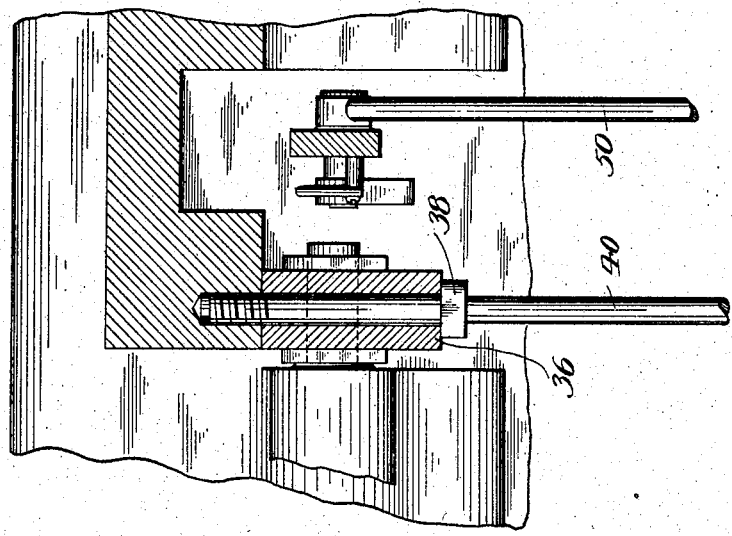
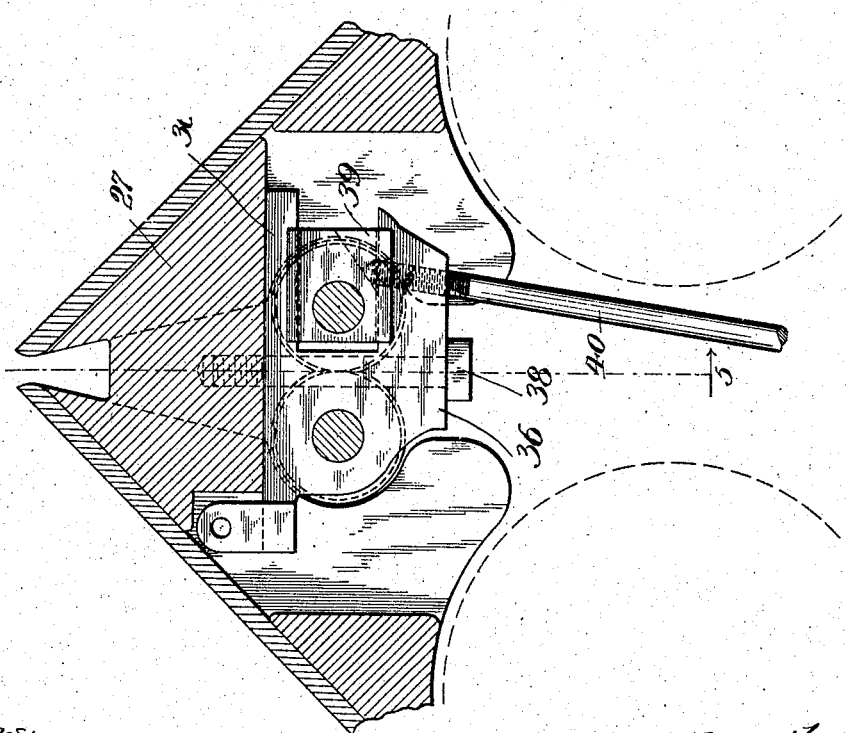
Witnesses:
Watson Hurlburt
Wm. Geiger
Inventor:
George D. Whitcomb,
By Louis K. Gillson
Atty.

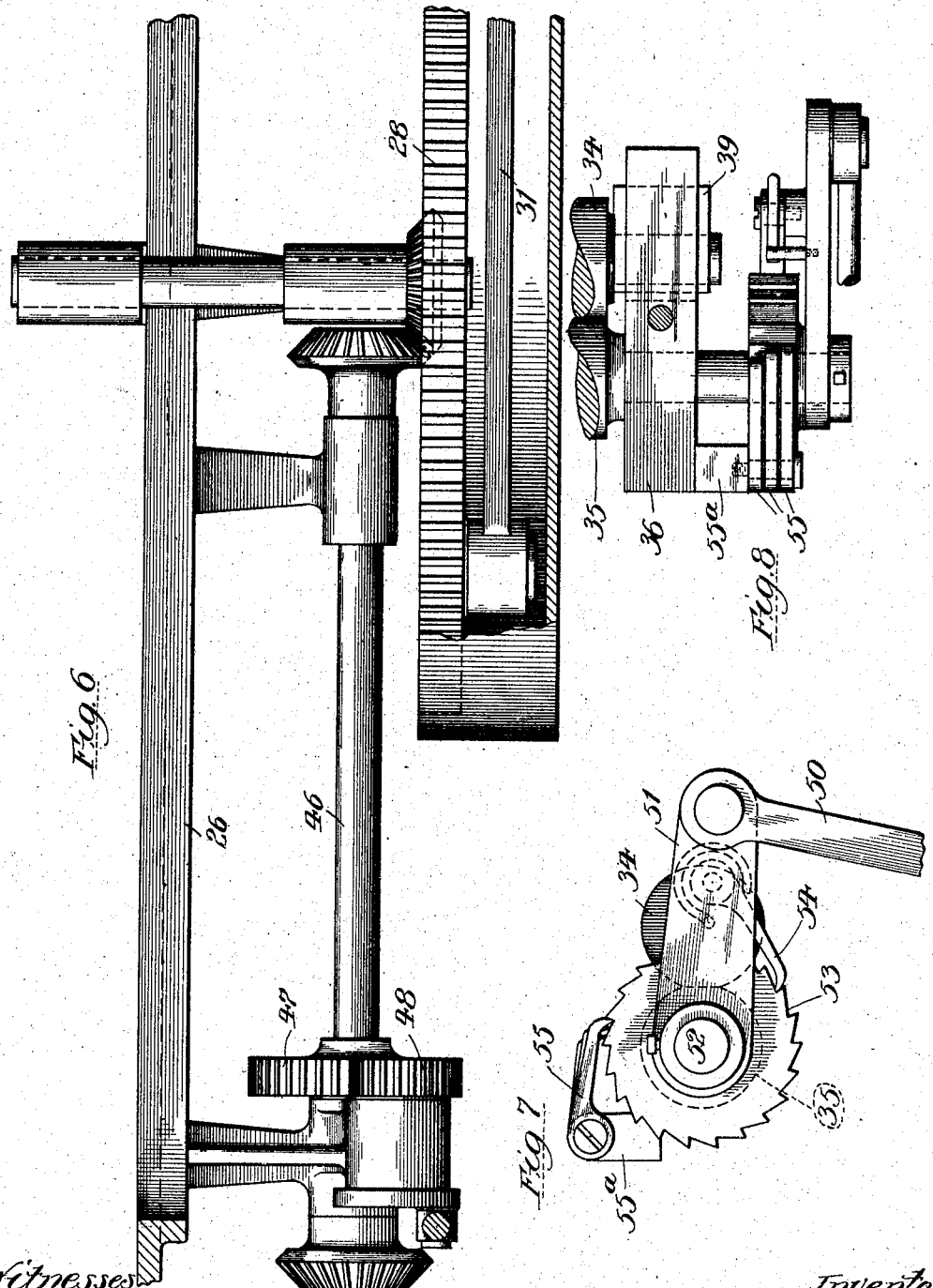

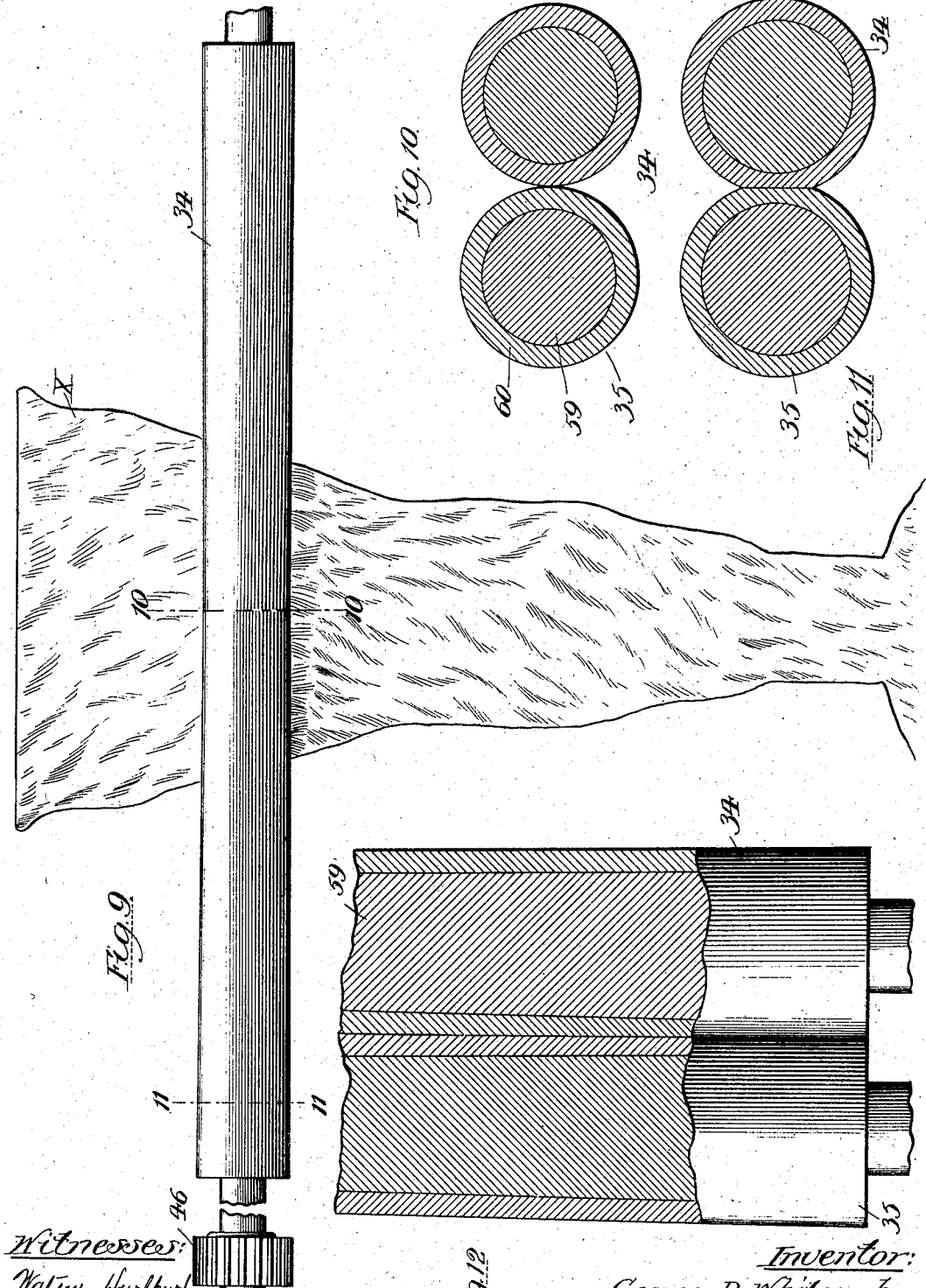

No. 781,253. PATENTED JAN. 31, 1905.
G. D. WHITCOMB.
KNITTING MACHINE.
APPLICATION FILED NOV. 14, 1900.
7 SHEETS—SHEET 7.
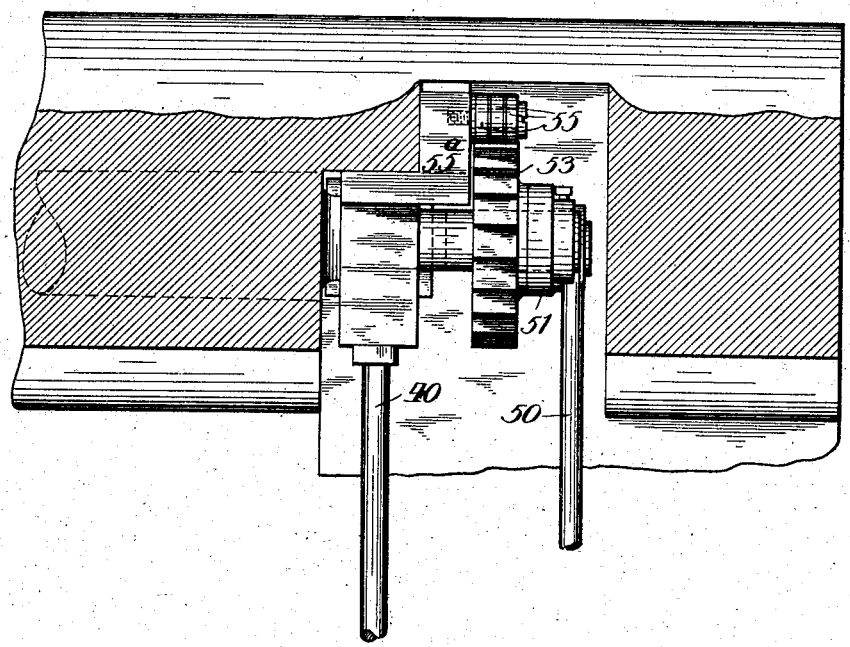
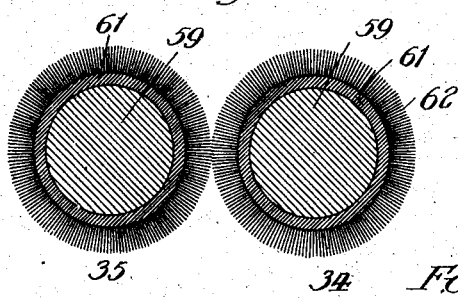
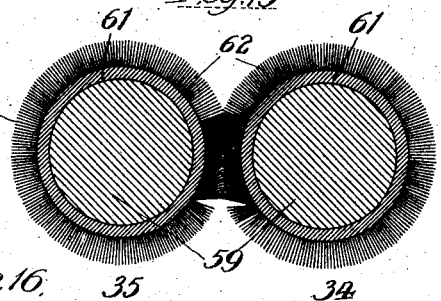
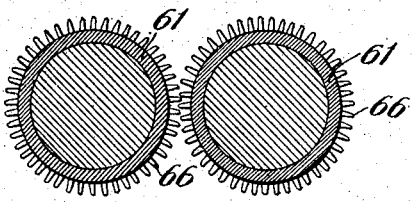
Witnesses:
Watson Hurlburt
Wm. Geiger
Inventor:
George D. Whitcomb.
By Louis K. Gillson, Atty.

No. 781,253. Patented January 31, 1905.

UNITED STATES PATENT OFFICE.

GEORGE D. WHITCOMB, OF GLENDORA, CALIFORNIA, ASSIGNOR TO GEORGE D. WHITCOMB CO., A CORPORATION OF ILLINOIS.

KNITTING-MACHINE.

SPECIFICATION forming part of Letters Patent No. 781,253, dated January 31, 1905.

Application filed November 14, 1900. Serial No. 36,523.

*To all whom it may concern:*

Be it known that I, GEORGE D. WHITCOMB, a citizen of the United States, and a resident of Glendora, county of Los Angeles, and State of California, have invented certain new and useful Improvements in Knitting-Machines, of which the following is a specification and which are illustrated in the accompanying drawings, forming a part thereof.

This invention relates more particularly to that type of knitting-machines in which two banks of needles are used and are mounted, respectively, upon inclined needle-beds so that their hooks reciprocate across a throat-space between the two beds and in which there is located immediately below the rearward portion of each of the needle-beds a pattern-cylinder for controlling the needles.

The objects of the invention are to improve upon the knitting-machines now in use by locating the take-up rolls adjacent to the throat of the machine, by so constructing these rolls that they hold the material more firmly at the edges than intermediate thereof, and by generally improving upon the construction of such take-up rolls and mechanism for actuating them.

The invention consists in the mechanism hereinafter fully described and which is illustrated in the accompanying drawings, in which—

Figure 1 is a detail side elevation of a knitting-machine of the type referred to, some of the parts being omitted and others being broken away. Fig. 2 is a vertical transverse section on the line 2 2 of Fig. 1. Fig. 3 is a detail plan view of the frame of the machine with the needle-bed plates removed and some portions being broken away. Fig. 4 is a detail section on the line 4 4 of Fig. 3. Fig. 5 is a detail section on the line 5 5 of Fig. 4. Fig. 6 is a detail section on the line 6 6 of Fig. 1. Fig. 7 is a detail of the mechanism for operating the take-up rolls. Fig. 8 is a detail plan of the same. Fig. 9 is a detail side elevation of the take-up rolls with a piece of fabric engaged thereby. Figs. 10 and 11 are sectional views of the take-up rolls, taken on the lines 10 10 and 11 11, respectively, of Fig. 9. Fig. 12 is a detail plan, partly in section, of the take-up rolls. Fig. 13 is a detail section on the line 13 13 of Fig. 2. Figs. 14 and 15 are transverse sections of the take-up rolls, taken on the lines 10 10 and 11 11, respectively, of Fig. 9 and showing a different form of construction of the rolls from that of Figs. 10 and 11; and Fig. 16 is a similar view showing a further modification.

The frame of the machine, as shown, comprises the uprights 25 25 25, side rails 26 26, and top rails 27 27. Upon the top rails 27 are mounted the needle-bed plates $27^a$, which are inclined toward each other at an angle of ninety degrees, their upper edges being spaced apart to form a throat 33, at which the product is fabricated and through which it descends.

The main drive-wheel of the machine is shown at 28 and is connected with a lever 29 for operating the cam-carriage (not shown) by means of a pitman 31, leading to a swinging arm 30, pivotally connected, as shown at $30^a$, with the lever 29. These parts are not directly related to the present invention and are but incidentally shown.

A pair of pattern-cylinders are located, as indicated at 32 32, immediately below the rearward portion of each of the needle-plates $27^a$.

In machines of this character it has heretofore been the practice to locate the tension or take-up rolls below the pattern-cylinders, and hence the considerable distance from the throat of the machine. It is found in practice that this is objectionable, particularly when that class of product is being fabricated in which the fashioning consists in widening as the work progresses, because it is of importance that the margins of the fabric be drawn taut, and unless the take-up rolls are in close proximity to the throat of the machine the tension will not be applied to the edges of the work as it is widened. It is also found that a knitted fabric draws more tightly at the edges than intermediate thereof, and hence unless the take-up rolls hold it very firmly there is apt to be slippage at the edges.

These difficulties have been overcome in the present invention by locating the take-up rolls between the pattern-cylinders and the throat of the machine and by causing the rolls to impinge against each other more firmly near their ends than at their middle portions.

The take-up rolls are shown at 34 35 and are journaled in boxes 36 37, secured at each end of the throat of the machine by means of screws 38 38, set into suitable apertures in a block cast integral with the top rails 27 27. In order that the take-up rolls may impinge against each other with a yielding pressure, the trunnions of one of them, as 34, are journaled in sliding bearing-blocks 39, fitted within suitable guideways in the boxes 36 37.

The rearward faces of the blocks 39 are beveled, as shown, and a screw-rod 40, setting through the box 36 or 37, bears against this inclined face so as to force the block forward to bring the two rolls into contact. The rod 40 is provided with a hand-wheel 41, by which it may be turned.

At their rearward ends the rolls 34 35 are provided with intermeshing gear-wheels 45 45, so that one roll is driven from the other and the two move in unison.

The following-described mechanism is provided for driving the take-up rolls step by step: A shaft 46, suitably journaled in brackets secured to the frame of the machine, is rotated from the drive-wheel 28, intermeshing beveled gears being mounted upon this shaft and upon the shaft of the drive-wheel. A gear-wheel 47, fixed upon the shaft 46, drives a pinion 48, fixed upon a shaft journaled in a suitably-supported bracket and carrying a crank 49, from which there leads a pitman 50 to an oscillating arm 51, swinging loosely upon the trunnion 52 of the roll 35. A ratchet-wheel 53, fixed upon the trunnion 52, coöperates with a spring-pawl 54, carried by the arm 51, so that the oscillation of this arm causes the intermittent advance of the rolls.

Retaining gravity-pawls 55, pivotally secured to an arm 55ᵃ, projecting upwardly from the box 36, coöperate with the ratchet-wheel 53 to prevent the recession of the take-up rolls as the pawl 54 moves backwardly. Preferably a plurality of these retaining-pawls is employed. As shown, there are three of differentiated lengths, so that should there be any variation in the throw of the arm 51 there will be no recession of the rolls.

In order that the strain upon the fabric may not be positive, as well as to provide for varying the speed of the take-up rolls, the pitman 50 is made in two sections having an adjustable spring connection. This is provided for by means of a loop 63, fixed to one member—as shown, the upper one of the pitmen—and in sliding engagement with the other, upon the threaded end of which there is placed a nut 64, between which and a shoulder of the loop at its outer end a spring 65 is interposed. Strain being transmitted through this cushioning-spring, the tension of the rolls is not positive.

The adjustment of the nut 64 or of the loop 63 upon the member of the pitman to which it is attached will determine the tension of the spring. When the latter is not normally under compression, the rolls will not be moved during the first part of the pitman-stroke, the spring tension being less than their frictional resistance.

In providing for the variable pressure of the tension-rolls upon the fabric I prefer to make them concave from end to end. This may of course be accomplished by cutting away their faces; but preferably it is secured by cutting away the face of the core or body portion 59 of the roll so that it is concave longitudinally. There may be sleeved upon such a core a covering 60, of soft material, such as rubber, of uniform thickness, and as a result of the form of the core the rolls will impinge against each other with increasing pressure from their middle portions to their ends, as clearly illustrated in Figs. 10, 11, and 12.

The object in view in varying the pressure of the tension-rolls against each other is to securely hold some portions of the fabric more firmly than other portions. As shown the machine is organized to firmly hold the margins of the fabric X against slippage, while allowing its central portion to slip slightly, so as to prevent the edges from drawing up, and thereby giving the fabric a baggy appearance. This result may be secured by various forms of construction of the cover of the rolls or one of them.

As shown in Figs. 14 and 15, the sleeve 61 is provided with bristles. The core of the rolls may be of the same concave form as shown in Fig. 12 and the bristles be of uniform length, so that at the center of the rolls the ends of the bristles would merely contact, as shown in Fig. 14, while toward and at the ends of the rolls they would intermesh, as shown in Fig. 15, so that the fabric would be held with increasing firmness toward and at its edges. The same result can be secured by using bristles differing in stiffness, those at the middle of the rolls being the most pliable and toward and at the ends of the rolls bristles of greater rigidity being used. The more pliable bristles will of course hold the fabric with less firmness than those which are more rigid.

In Fig. 16 a construction is shown in which the sleeve 61, of rubber, is provided with integral points 66. Such a sleeve is to be preferred to the smooth sleeve shown in Figs. 10, 11, and 12.

By the construction shown and described the maximum tension of the fabric is determined by the stiffness of the spring 65 and the minimum tension is determined by the frictional grasp of the rolls at the center of the fabric.

I claim as my invention—

1. In a straight-knitting machine, in combination, a pair of parallel needle-plates spaced apart to form a throat, and take-up rolls located adjacent to such throat whereby the line of draft on the edges of the fabric is substantially direct through the entire width of the fabric though such width may be varied in fashioning.

2. In a knitting-machine, in combination, needle-plates spaced apart to form a throat, pattern-cylinders for controlling the needles located below the rearward portions of the plates, and take-up rolls, located between the pattern-cylinders and the throat.

3. In a knitting-machine, in combination with the fabricating mechanism, a pair of take-up rolls adapted to impinge against each other with variable pressure from end to end whereby some portions of the fabric are held less firmly than other portions.

4. In a knitting-machine, in combination with the fabricating mechanism, a pair of take-up rolls, one or both of such rolls having a longitudinally-concave face, and a yielding sleeve of uniform thickness covering the said roll or rolls.

5. A take-up roll for knitting-machines having a longitudinally-concave rigid body or core and its face provided with radially-projecting bristles.

6. A take-up roll for knitting-machines having a longitudinally-concave rigid body or core, and having its face provided with radially-projecting points.

7. A pair of take-up rolls for knitting-machines, each having a rigid body or core and having a face formed of radially-projecting bristles arranged to hold the fabric with increasing firmness from the middle of the rolls toward their ends.

8. A take-up roll for knitting-machines having a longitudinally-concave surface, its face being covered with yielding radial projections.

9. In a knitting-machine, in combination, a pair of take-up rolls one of which is journaled in fixed bearings while the other is journaled in bearing-blocks slidable toward and away from the first-mentioned roll, the rearward face of each of the blocks being beveled, and a screw-rod bearing against such beveled face and designed when turned to move the block so as to bring the rolls in contact.

GEORGE D. WHITCOMB.

Witnesses:
U. G. LEE,
W. K. MILLHOLLAND.